United States Patent [19]

Danzaki et al.

[11] Patent Number: 5,085,286
[45] Date of Patent: Feb. 4, 1992

[54] CAR-SPEED CONTROL SYSTEM

[75] Inventors: Tsutomu Danzaki; Toshio Iwaoka; Yuichi Yamaguchi; Akihiko Tsukahara, all of Yokohama, Japan

[73] Assignee: Jidosha Denki Kogyo K.K., Kanagawa, Japan

[21] Appl. No.: 638,593

[22] Filed: Jan. 8, 1991

[30] Foreign Application Priority Data

Jan. 9, 1990 [JP] Japan .................................. 2-2161

[51] Int. Cl.⁵ ............................................. B60K 31/04
[52] U.S. Cl. ................................. 180/179; 123/352; 364/426.04
[58] Field of Search ............... 180/170, 175, 176, 177, 180/178, 179; 123/352, 396, 351, 361; 364/431.07, 426.01, 426.04, 431.11

[56] References Cited

U.S. PATENT DOCUMENTS

| | | | |
|---|---|---|---|
| 4,540,060 | 9/1985 | Kawata et al. | 180/179 |
| 4,747,460 | 5/1988 | Tomishige et al. | 180/177 |
| 4,885,692 | 12/1989 | Kurihara et al. | 180/179 |
| 4,893,243 | 1/1990 | Tada et al. | 180/179 |
| 4,928,779 | 5/1990 | Yamada | 180/179 |
| 4,941,098 | 7/1990 | Yasukawa et al. | 180/179 |
| 5,038,879 | 8/1991 | Naito et al. | 180/179 |

Primary Examiner—Andres Kashnikow
Assistant Examiner—Richard Camby
Attorney, Agent, or Firm—Sughrue, Mion, Zinn Macpeak & Seas

[57] ABSTRACT

A car-speed control system is provided with a car-speed sensor, a command switch, an actuator having an electromagnetic clutch, an actuator-driving circuit, a clutch-driving circuit, a car-speed memory, a controller and a comparing circuit for comparing voltage level with reference voltage at the time of changing the electromagnetic clutch to its unexcited state and for changing the actuator-driving circuit to its non-driving state if the voltage level of the clutch-driving means is higher than the exciting voltage of the electromagnetic clutch.

3 Claims, 3 Drawing Sheets

CAR-SPEED CONTROL SYSTEM

BACKGROUND OF THE INVENTION

1. Field of the Invention

This invention relates to a car-speed control system used for controlling the travelling speed of a motor vehicle at a set point automatically.

2. Description of the Prior Art

Heretofore, there have been various types of such car-speed control systems. Among them, for example, there has been a car-speed control system having circuit formation as shown in FIG. 3.

A car-speed control system 101 shown in FIG. 3 is provided with a car-speed sensor 102 for generating a speed signal in response to an actual car-speed, a command switch 103 for outputting a cruise command signal, an actuator 104 for driving a throttle 105 by rotation of a driving motor 104b through an electromagnetic clutch 104a, a driving circuit 106 for rotating the driving motor 104b of the actuator 104 in the forward or reverse direction, a clutch-driving circuit 107 for changing the electromagnetic clutch 104a of the actuator 104 off and on electromagnetically, a detecting circuit 108 for detecting voltage level of the clutch-driving circuit 107 when the electromagnetic clutch 104a of the actuator 104 is in an unexcited state, and housed with a car-speed memory for memorizing the speed signal of the car-speed sensor 102 in response to an operation (ON-operation or OFF-operation) of the command switch 103 and a controller for controlling the driving circuit 106 in accordance with difference between actual car-speed and memorized car-speed and actuating the clutch-driving circuit 107 in a microcomputer 109.

The clutch-driving circuit 107 has circuit formation provided with a pnp-type transistor Tr101, a npn-type transistor Tr102, a diode D101 for passing a base current of the transistor Tr101 in one direction when the transistor Tr102 functions, a diode D102 for protecting the transistor Tr101 from back electromotive force, a diode D103 for protecting the transistor Tr102 from back electromotive force and a resistors R101 to R103, passes the base current of the transistor Tr101 and actuates the transistor Tr101 by actuating the transistor Tr102 according to a clutch-driving signal output from the microcomputer 109, and causes the electromagnetic clutch 104a of the actuator 104 to be in its excited state.

The detecting circuit 108 has circuit formation provided with resistors R105 to R107 for dropping voltage level at a node A, a diode D105 and a condenser C101, detects voltage level of the transistor Tr101 of the clutch-driving circuit 107 and inputs the voltage level into the microcomputer 109 by detecting voltage level at the node A when the electromagnetic clutch 104a of the actuator 104 is in an unexcited state.

In the car-speed control system 101, by operating a setting switch of the command switch 103, the car-speed at the time of the operation is memorized in the car-speed memory in the microcomputer 109. The controller actuates the driving circuit 106 and causes the electromagnetic clutch 104a of the actuator 104 to be in the excited state according to the difference between the memorized car-speed and the actual car-speed, thereby driving the throttle 105 in the opening or closing direction by the rotation of the driving motor 104b of the actuator 104 through the electromagnetic clutch 104a, and the car-speed is controlled into the memorized car-speed so as to travel at a desired constant speed. Depressing a brake pedal at the time of traveling in the constant speed, the state in which the car-speed is kept under control is cancelled by inputting a cancel signal generated according to the depressing operation of the brake pedal into the controller in the microcomputer 109, the rotation of the driving motor 104b in the actuator 104 is discontinued by the driving circuit 106 according to a cancel signal output from the controller, and the electromagnetic clutch 104a of the actuator 104 is made to change to the unexcited state, thereby cancelling the system.

However, in the aforementioned conventional car-speed control system 101, it is only possible to detect functional abnormality in the clutch-driving circuit 107 in the range up to input voltage level of the microcomputer 109 by the detecting circuit 108, because there is a limit in the input voltage level of the microcomputer 109 at the time of detecting the functional abnormality of the clutch-driving circuit 107 by the microcomputer 109 through the detecting circuit 108 after breaking the electromagnetic connection of the electromagnetic clutch 104a of the actuator 104. Such a state corresponds to the state in which the transistors Tr101 and Tr102 in the clutch-driving circuit 107 break down by open breakage, and there is problem since there is a possibility that it is impossible to detect the functional abnormality in the clutch-driving circuit 107 on the assumption that there is a very rarely case where the detecting circuit 108 is impressed with high voltage equivalent to the voltage level at the electromagnetically connected state of the electromagnetic clutch 104a according to trouble caused by short breakage of the transistors Tr101 and Tr102.

SUMMARY OF THE INVENTION

This invention is made with the object of providing a car-speed control system which is possible to detect functional abnormality in the clutch-driving means in the range up to voltage level corresponding to the electromagnetical connection of the electromagnetic clutch means.

The construction of the car-speed control system, according to this invention for attaining the above-mentioned object is characterized by comprising, as shown in a functional block diagram in FIG. 1, a car-speed detecting means 1 for generating a speed signal in response to an actual car-speed, a switch means 2 for outputting a cruise command signal, an actuator 3 for driving a throttle means 4 through a electromagnetic clutch means 3b, an actuator-driving means 5 for driving the actuator 3 in one direction or the reverse direction, a clutch-driving means for changing the electromagnetic clutch means 3b of the actuator 3 off and on, a car-speed memory means 7 for memorizing the speed signal generated by the car-speed detecting means 1 in response to operation of the switch means 2, a control means 8 for controlling the actuator-driving means 5 in accordance with difference between actual car-speed and memorized car-speed and for controlling operation of the clutch-driving means 6, and a comparing means 9 for detecting voltage level of the clutch-driving means 6 and comparting said voltage level with reference voltage level set equally to exciting voltage of the electromagnetic clutch means 3b when the electromagnetic clutch means 3b is in its unexcited state, and for changing the actuator-driving means 5 to its non-driving state if the voltage level of the clutch-driving means 6 is higher than the exciting voltage of the electromagnetic clutch means 3b.

In the car-speed control system according to this invention, the comparing means 9 detects voltage level of the clutch-driving means 6 and comparing the voltage level with reference voltage level set into exciting voltage of the electromagnetic clutch means 3b at the time of detecting the functional abnormality of the clutch-driving means 6 after changing the electromagnetic clutch means 3b of the actuator 3 to its unexcited state. Therefore, the car-speed control system is so designed that the control means 8 may sense functional abnormality of the clutch-driving means 6 that generates voltage higher than the exciting voltage level of the electromagnetic clutch means 3b according to the result of the aforementioned comparison.

DESCRIPTION OF THE PREFERRED EMBODIMENT

This invention will be explained below on basis of the drawings.

Figure 2:
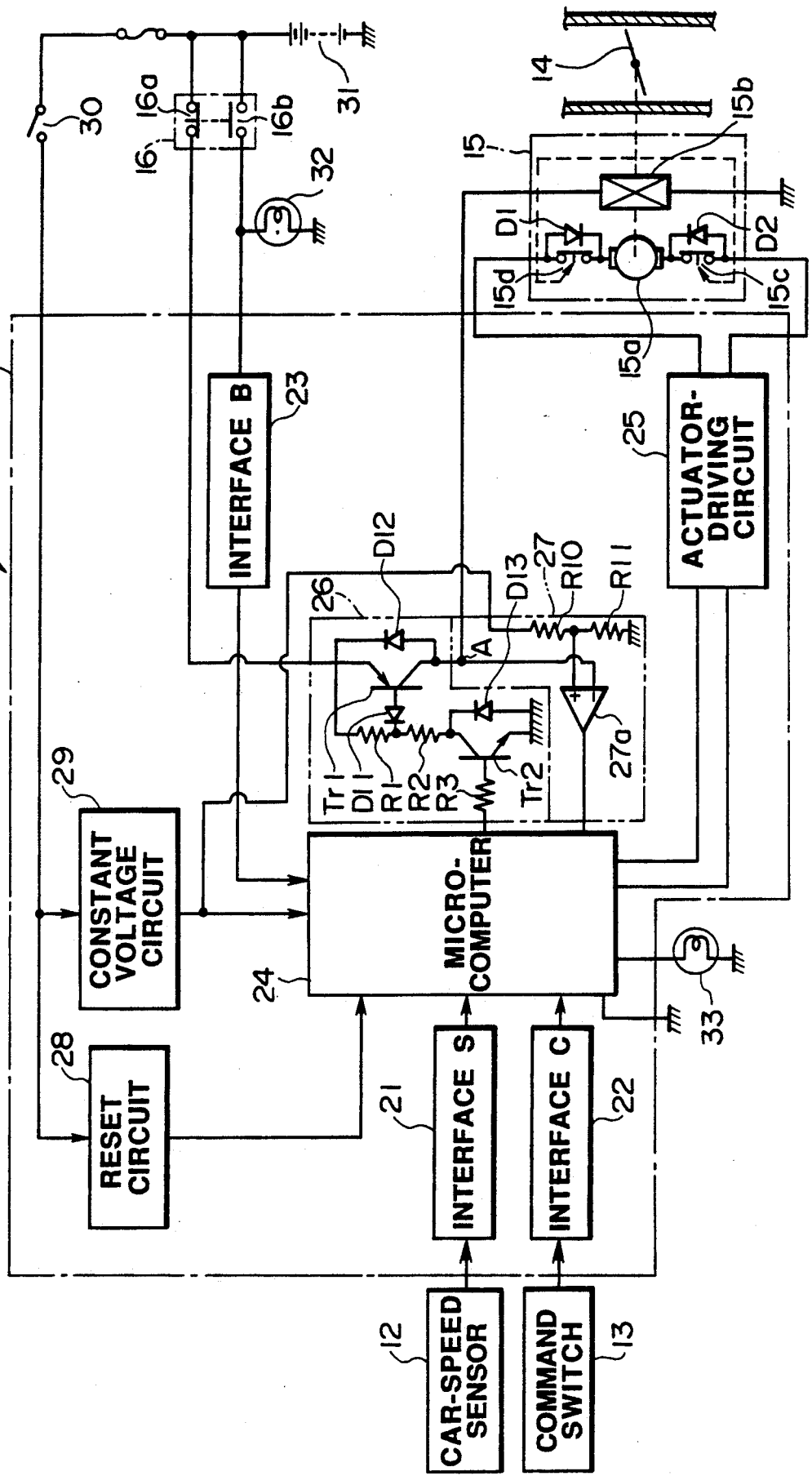
FIG. 2 is a diagram illustrating the circuit configuration of an embodiment of the car-speed control system according to this invention.
Figure 3:
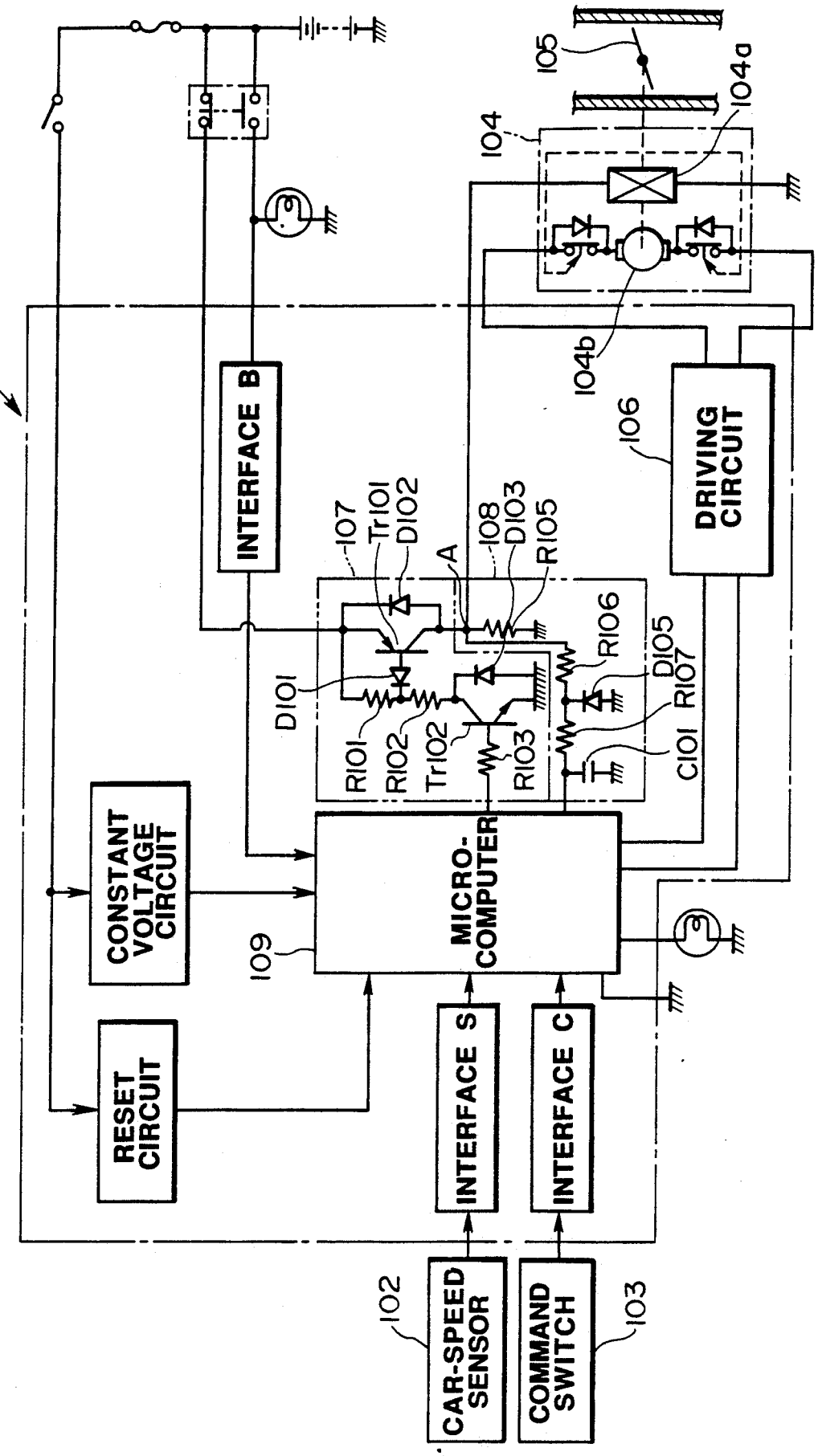
FIG. 3 is a diagram illustrating the circuit configuration of the conventional car-speed control system.

FIG. 2 is a graph showing an embodiment of the car-speed control system according to this invention and a circuit configuration of the car-speed control system.

In FIG. 2, numeral 11 shows a car-speed control system. The car-speed control system 11 is provided with a car-speed sensor 12 (corresponding to the car-speed detecting means 1 shown in FIG. 1) for outputting car-speed data proportional to an actual car-speed as pulse signal, a command switch 13 (corresponding to the switch means 2 shown in FIG. 1) for outputting a cruise command signal, a motor driven actuator 15 (corresponding to the actuator 3 shown in FIG. 1) for driving a throttle 14 (corresponding to the throttle means 4 shown in FIG. 1) of the motor vehicle and a brake switch 16 linked to the depressing operation of a brake pedal (not shown), and has a circuit configuration provided with a microcomputer 24 input with respective operating signals from the car-speed sensor 12, the command switch 13 and the brake switch 16 through respective interface circuits 21, 22 and 23, an actuator-driving circuit 25 (corresponding to the actuator-driving means 5 shown in FIG. 1) for driving a driving motor 15a (which will be described later) of the actuator 15 in the opening or closing direction of the throttle 14 (that is, in the forward or reverse rotational direction) under control of the microcomputer 24, a clutch-driving circuit 26 (corresponding to the clutch-driving means 6 shown in FIG. 1) for changing an electromagnetic clutch 15b (which will be described later) of the actuator 15 off and on under control of the microcomputer 24, a comparing circuit 27 (corresponding to the comparing means 9 shown in FIG. 1) for detecting voltage level of the clutch-driving circuit 26 at the time of changing the electromagnetic clutch 15b of the actuator 15 and for changing the actuator-driving circuit 25 to its non-actuated state through the microcomputer 24 if the voltage level of the clutch-driving circuit 26 is higher than exciting voltage of the electromagnetic clutch 15b, a reset circuit 28 and a constant-voltage circuit 29 in a control part 20.

And the car-speed control system 11 is provided with a main switch 30, a battery 31 loaded on the vehicle, a brake lamp 32 and a cruise lamp 33 on the outside of the control part 20. Further, the command switch 13 includes setting switch, a resuming switch, an accelerating switch and so on.

Figure 1:
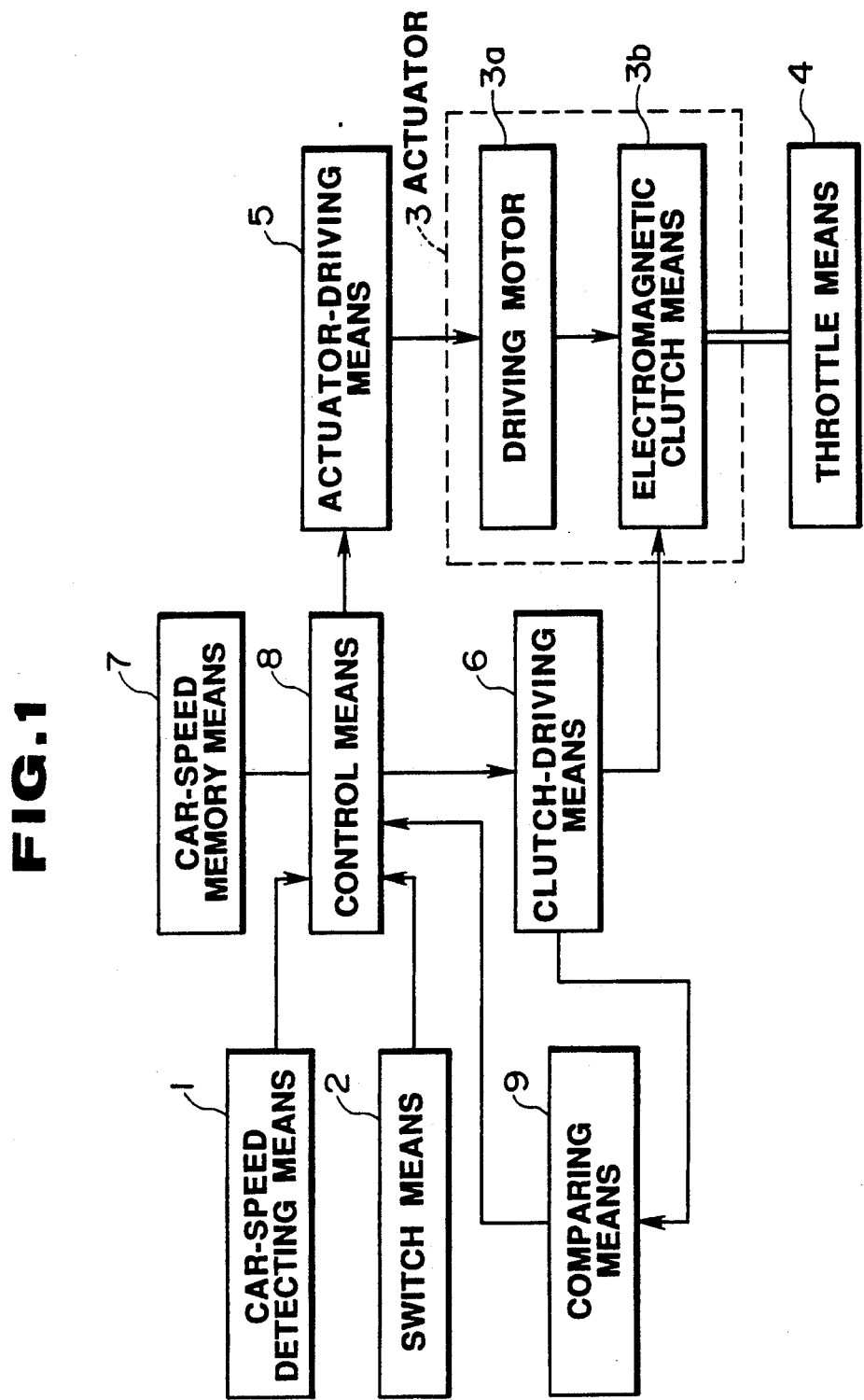
FIG. 1 is a functional block diagram showing the basic arrangement of the car-speed control system according to this invention.

The actuator 15 is provided with the driving motor 15a to be driven in the forward or reverse rotational direction by the actuator-driving circuit 25, the electromagnetic clutch 15b (corresponding to the electromagnetic clutch means 3b shown in FIG. 1) for transmitting the rotation of the driving motor 15a to the throttle 14 through a reduction gear (not shown) by the clutch-driving circuit 26, a first limit switch 15c for detecting the full-opened state of the throttle 14 at the corresponding position in the actuator 15, a second limit switch 15d (which enters OFF-state when the throttle 14 arrives at the full-closed position) for detecting the full-closed state of the throttle 14 at the corresponding position in the actuator 15, a diode D1 bypassing the second limit switch 15d for passing an electric current in the opening direction of the throttle 14 when the throttle 14 is in the full-closed state, and a diode D2 bypassing the first limit switch 15c for passing an electric current in the closing direction of the throttle 14 when the throttle 14 is in the full-opened state. Additionally, the actuator 15 and throttle 14 are connected through an output link or the like.

The brake switch 16 is provided with a normally-closed first switch 16a and a normally-opened second switch 16b, and is so structured that the first switch 16a enters the open-state by linking with the depressing operation of the brake pedal (not shown) and outputs a cancelling signal to the clutch-driving circuit 26, and the second switch 16b enters the close-state and outputs a cancelling signal to the microcomputer 24 through the interface circuit 23.

The microcomputer 24 is housed with a car-speed memory (corresponding to the car-speed memory means 7 shown in FIG. 1) for memorizing the car-speed at the time of OFF-operation of the ON-operation of setting switch of the command switch 13 subsequent to the setting switch (which may be designed so as to memorize the car-speed at the time of ON-operation), and a controller (corresponding to the control means 7 shown in FIG. 1) for causing the electromagnetic clutch 15b of the actuator 15 to become the excited state by actuating the clutch-driving circuit 26 in response to the OFF-operation of the setting switch 13 and comparing the car-speed memorized by the car-speed memory with the actual car-speed output from the car-speed sensor 12 and controlling the car-speed so as to accord the actual car-speed with the memorized car-speed by actuating the actuator-driving circuit 25 in response to the difference between the actual and the memorized car-speeds and for changing the actuator-driving circuit 25 to its non-driving state when the comparing circuit 27 detects functional abnormality in the clutch-driving circuit 26.

The clutch-driving circuit 26 has a circuit configuration provided with a pnp-type transistor Tr1, a npn-type transistor Tr2, a diode D11 for passing a base current of the transistor Tr1 in one direction when the transistor Tr2 functions, a diode D12 connected in parallel to the transistor Tr1 for protecting the transistor Tr1 from back electromotive force, a diode D13 connected in parallel to the transistor Tr2 for protecting the transistor Tr2 from back electromotive force and resistors R1 to R3.

The comparing circuit 27 has a circuit configuration provided with an operational amplifier 27a of which ⊖ terminal is input with voltage level at a node A, and resistors R10 and R11 for inputting reference voltage dropped dividingly into a ⊕ terminal of the operational amplifier 27a, and is so designed as to input a detection signal having "H" level into the microcomputer 24 from the operational amplifier 27a when the voltage at the node A exceeds exciting voltage of the electromagnetic clutch 15b owing to functional abnormality in the clutch-driving circuit 26 by setting the reference voltage input to the ⊕ terminal of the operational amplifier 27a equal to the exciting voltage of the electromagnetic clutch 15b of the actuator 15.

Next, the explanation will be given on the function of the car-speed control system 11 having the above-mentioned configuration.

First of all, the main switch 30 is switched to the ON-state in order to actuate the car-speed control system 11. In this time, the car-speed sensor 12 outputs a pulse signal that is car-speed data proportional to the actual car-speed to the microcomputer 24 in the control part 20. The pulse signal is sampled for a specified time, thereby the microcomputer 24 detects the pulse number proportional to the present car-speed. In this state, the cruise lamp 33 is lighted at the time of cancelling a setting signal subsequent to the input of the setting signal into the controller in the microcomputer 24 by operating the setting switch of the command switch 13, and the pulse number according to the car-speed at that time is memorized by the car-speed memory in the microcomputer 24. The controller in the microcomputer 24 actuates the transistor Tr1 by actuating the transistor Tr2 and passing a base current of the transistor Tr1 in the clutch-driving circuit 26, thereby changing the electromagnetic clutch 15b of the actuator 15 to its excited state and the throttle 14 is enabled to be opened or closed by the rotation of the driving motor 15a in the actuator 15.

And in this state, a motor driving signal in response to the pulse number memorized in the car-speed memory in the microcomputer 24 is output from the controller in the microcomputer 24, the driving motor 15a of the actuator 15 is rotated in the forward direction through the actuator-driving circuit 25 according to the motor-driving signal, and the throttle 14 is driven and maintained at the proper position through the electromagnetic clutch 15b and the output link (not shown). Thereafter, the throttle 14 is maintained at the proper position without operating the accelerator pedal, and the motor vehicle can travel at a constant traveling speed.

Concerning the control of the car-speed in this time, the controller in the microcomputer 24 compares the pulse number proportional to the actual car-speed of the car-speed sensor 12 with the pulse number memorized by the car-speed memory in the microcomputer (memorized car-speed), outputs the motor-driving signal in response to the difference between the actual and memorized car-speeds into the actuator-driving circuit 25, and rotates the driving motor 15a in the actuator 15 in the opening or closing direction of the throttle 14 in order to maintain the car-speed constant.

And at the case of cancelling the aforementioned car-speed control, depressing the brake pedal, the first switch 16a of the brake switch 16 changes to the OFF-state (which is in the ON-state normally) and the second switch 16b changes to the ON-state (which is in the OFF-state normally) linking with the depressing operation of the brake pedal.

Thereby, a cancelling signal is input into the microcomputer 24 through the interface circuit 23 in response to the ON-state of the second switch 16b of the brake switch 16. At the same time, power supply to an emitter of the transistor Tr1 in the clutch-driving circuit 26 is interrupted in response to the OFF-state of the first switch 16a of the brake switch 16 and the electromagnetic clutch 15b changes to the unexcited state.

And voltage level at the node A is detected by the operational amplifier 27a of the comparing circuit 27 at the time of causing the transistor Tr2 of the clutch-driving circuit 26 to be in the non-actuated state by the microcomputer 24 according to the cancelling signal input into the microcomputer 24. In the operational amplifier 27a, the voltage level at the node A input to the ⊖ terminal of the operational amplifier 27a is compared with reference voltage input to the ⊕ terminal and a detection signal with "H" level is input to the microcomputer 24 from the operational amplifier 27a if the voltage level of the clutch-driving circuit 26 is higher than the reference voltage set equally to exciting voltage of the electromagnetic clutch 15b. Therefore, it is possible to detect a trouble caused by short breakage in the transistor Tr1 or Tr2 of the clutch-driving circuit 26, in such a case the microcomputer 24 caused the actuator driving means 25 to become the non-driving state according to the detection signal having "H" level, thereby preventing the motor vehicle to travel under the control by this system.

In the case of a trouble caused by open breakage in the transistor Tr1 or Tr2 of the clutch-driving circuit 26, the car-speed is never controlled according to this system because it is impossible to change the electromagnetic clutch 15b of the actuator 15 to the excited state.

As mentioned above, the car-speed control system according to this invention comprises a car-speed detecting means for generating a speed signal in response to an actual car-speed, a switch means for outputting a cruise command signal, an actuator for driving a throttle means through an electromagnetic clutch means, an actuator-driving means for driving the actuator in one direction or the reverse direction, a clutch-driving means for changing the electromagnetic means of the actuator off and on, a car-speed memory means for memorizing the speed signal generated by the car-speed detecting means in response to operation of the switch means, a control means for controlling the actuator-driving means in accordance with difference between actual car-speed and memorized car-speed and for controlling working of the clutch-driving means, and a comparing means for detecting voltage level of the clutch-driving means and comparing the voltage level with reference voltage level set equally to exciting voltage of the electromagnetic clutch means when the electromagnetic clutch means is in an unexcited state, and for changing the actuator-driving means to its non-driving state if the voltage level of the clutch-driving means is higher than the exciting voltage of the electromagnetic clutch means. Therefore, it is possible to detect voltage ranging up to voltage level equivalent to electromagnetic connection of the actuator by comparing the reference voltage with the voltage level of the clutch-driving means by the comparing means and it is enabled to detect abnormality securely at the time of changing the electromagnetic clutch means to the unexcited state even if the comparing means is applied with voltage equivalent to electromagnetic connection of the electromagnetic clutch means owing to functional abnormality of the clutch-driving means. Accordingly, it is possible to prevent the car-speed control under the condition in which the clutch-driving means has functional abnormality.

What is claimed is:

1. A car-speed control system comprising:
   a car-speed detecting means for generating a speed signal in response to an actual car-speed;
   a switch means for outputting a cruise command signal;
   an actuator for driving a throttle means through an electromagnetic clutch means;
   an actuator driving means for driving said actuator in one direction or the reverse direction;
   a clutch-driving means for changing said electromagnetic clutch means of said actuator off and on;
   a car speed memory means for memorizing the speed signal generated by the car-speed detecting means in response to operation of said switch means;
   a control means for controlling said actuator-driving means in accordance with difference between actual car-speed and memorized car-speed and for controlling working of said clutch-driving means; and
   a comparing means for detecting a voltage level of said clutch-driving means and comparing said voltage level with a reference voltage level set equally to an exciting voltage of said electromagnetic clutch means when the electromagnetic clutch means is in an unexcited state, and for changing said actuator-driving means to its non-driving state if said voltage level of the clutch-driving means is higher than said exciting voltage of the electromagnetic clutch means.

2. A car-speed control system as claimed in claim 1, wherein said actuator is provided with a driving motor for driving the throttle means by rotation of said driving motor through said electromagnetic clutch means.

3. A car-speed control system as claimed in claim 1, wherein said comparing means for detecting voltage level of said clutch-driving means has a circuit provided with an operational amplifier as a comparator and resistors for inputting reference voltage dropped dividingly into a plus terminal at the operational amplifier.

* * * * *